(12) United States Patent
Uenohara (10) Patent No.: US 8,201,676 B2
(45) Date of Patent: Jun. 19, 2012

(54) CLUTCH COVER ASSEMBLY

(75) Inventor: Norihisa Uenohara, Osaka (JP)

(73) Assignee: EXEDY Corporation, Osaka (JP)

( * ) Notice: Subject to any disclaimer, the term of this patent is extended or adjusted under 35 U.S.C. 154(b) by 357 days.

(21) Appl. No.: 12/161,831

(22) PCT Filed: Jan. 19, 2007

(86) PCT No.: PCT/JP2007/050751
§ 371 (c)(1),
(2), (4) Date: Jul. 23, 2008

(87) PCT Pub. No.: WO2007/086313
PCT Pub. Date: Aug. 2, 2007

(65) Prior Publication Data
US 2010/0224460 A1 Sep. 9, 2010

(30) Foreign Application Priority Data

Jan. 25, 2006 (JP) .................. 2006-016213

(51) Int. Cl.
*F16D 13/46* (2006.01)
*F16D 13/75* (2006.01)
(52) U.S. Cl. .............. 192/70.27; 192/89.23; 192/109 R
(58) Field of Classification Search ............... 192/70.27, 192/89.23, 109 R
See application file for complete search history.

(56) References Cited

U.S. PATENT DOCUMENTS

| 4,207,972 | A | * | 6/1980 | Zeidler ..................... 192/70.252 |
| 5,509,518 | A | * | 4/1996 | Zelikov ..................... 192/70.252 |
| 5,823,312 | A | | 10/1998 | Reik et al. |
| 5,873,442 | A | * | 2/1999 | Uehara ..................... 192/70.252 |
| 6,116,400 | A | * | 9/2000 | Muller et al. ............. 192/109 R |
| 6,405,846 | B1 | * | 6/2002 | Reik et al. ................. 192/70.252 |
| 2002/0179397 | A1 | * | 12/2002 | Bach et al. ................. 192/109 R |
| 2004/0099501 | A1 | * | 5/2004 | Payne .......................... 192/70.27 |
| 2007/0131511 | A1 | * | 6/2007 | Uenohara ................ 192/70.252 |
| 2008/0139323 | A1 | * | 6/2008 | Paumier et al. .................. 464/98 |

FOREIGN PATENT DOCUMENTS

| DE | 197 12 550 A1 | 11/1997 |
| DE | 42 44 817 B4 | 5/2005 |
| FR | 2 764 955 A1 | 12/1998 |
| JP | H02-143526 U | 12/1990 |
| JP | H03-022131 U | 3/1991 |
| JP | H07-259880 A | 10/1995 |
| JP | H08-505690 A | 6/1996 |
| JP | H09-079284 A | 3/1997 |
| JP | 2006-017166 A | 1/2006 |

OTHER PUBLICATIONS

Extended European Search Report of the corresponding European Application No. 07707055.5, dated Apr. 19, 2011.

* cited by examiner

*Primary Examiner* — David D Le
*Assistant Examiner* — Jacob S Scott
(74) *Attorney, Agent, or Firm* — Global IP Counselors, LLP (57) ABSTRACT

A clutch cover assembly (1) is a clutch cover assembly for pressing and releasing a friction member of a clutch disk assembly against and from the flywheel of an engine, and includes a clutch cover (2), a pressure plate (3), a diaphragm spring (4), a cone spring (14), and a limiting mechanism (10). The limitation mechanism (10) limits movement of the pressure plate (3) to the flywheel (51) side when the amount of wear of the friction member (53) has reached a maximum allowable wear amount.

10 Claims, 6 Drawing Sheets

CLUTCH COVER ASSEMBLY

CROSS-REFERENCE TO RELATED APPLICATIONS

This U.S. National stage application claims priority under 35 U.S.C. §119(a) to Japanese Patent Application No. 2006-016213, filed in Japan on Jan. 25, 2006, the entire contents of which are hereby incorporated herein by reference.

FIELD OF THE INVENTION

The present invention relates to a clutch cover assembly, and more particularly relates to a way to press and to release a friction member of a clutch disk assembly against and from the flywheel of an engine.

BACKGROUND ART

A clutch cover assembly is generally mounted to the flywheel of an engine, and is used to transmit the drive force of the engine to the transmission side. This clutch cover assembly mainly includes a clutch cover that is fixed to the flywheel, a pressure plate that sandwiches the friction member of the clutch cover assembly between itself and the flywheel, and a diaphragm spring that presses the pressure plate to the flywheel side. The diaphragm spring is made of an annular elastic component and a plurality of levers extending from the annular elastic component to the inside in the radial direction. The diaphragm spring functions to press on the pressure plate, and also functions to release the pressing against the pressure plate.

The pressing load characteristics of a clutch cover assembly will be described. The pressing load curve expresses a usage region as a pressing load in the load curve of a diaphragm spring. For example, as shown in FIG. 5, which is a graph of the pressing load curve 20, the effective usage region of the clutch cover assembly (wear allowance) is the region over which a specific pressing load can be obtained (from the set line 25 of a new part to the wear line 26 at which the friction member reaches the wear limit).

Figure 6:
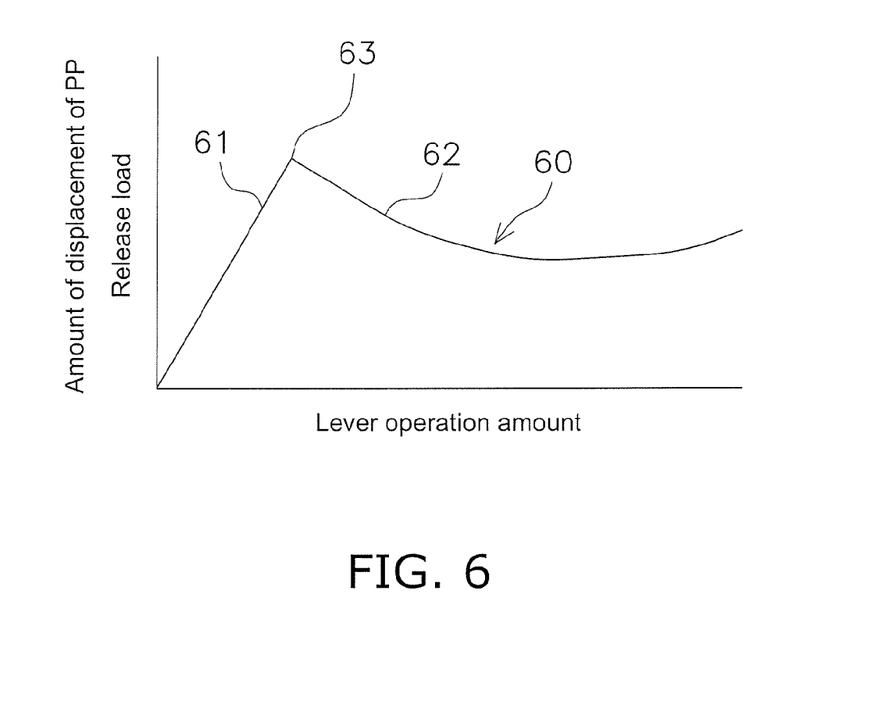
FIG. 6 is a graph of release load characteristics.

Next, the release load curve of the clutch cover assembly will be described. The release load curve expresses the relationship between the amount by which a release lever is operated (the lever stroke) and the load acting on the distal end of the release lever (the release load). For example, as shown in FIG. 6, a release load curve 60 has a first portion 61 that increases linearly from a lever operation amount of zero, and a second portion 62 that smoothly decreases. The first portion 61 expresses the lever stiffness of the diaphragm spring, while the second portion 62 corresponds to a change in the release load curve from the set line to the right in the drawing.

Figure 5:
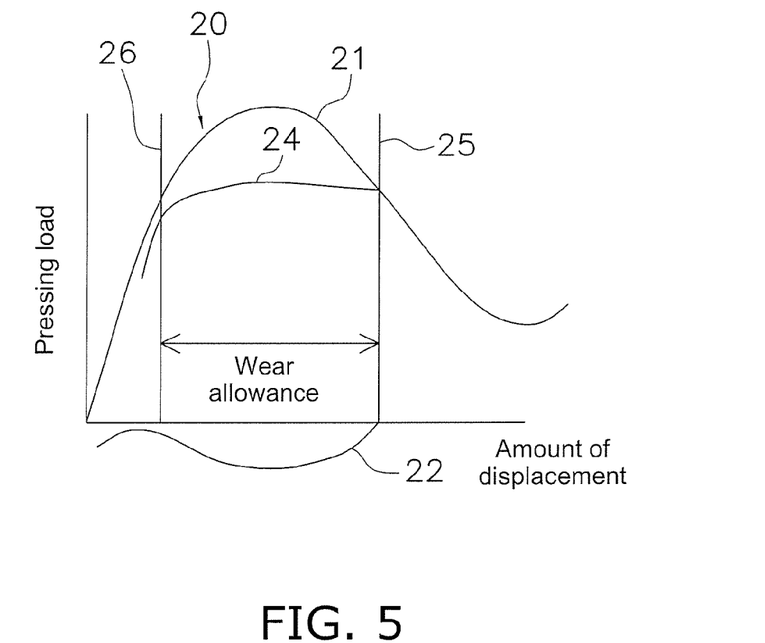
FIG. 5 is a graph of pressing load characteristics.

As shown in FIG. 5, the pressing load curve 20 rises at a constant rate as the amount of displacement of the diaphragm spring increases from zero, but once the amount of deflection passes a certain point (the peak point), the curve falls smoothly thereafter, and when another amount of deflection is exceeded, rises smoothly. Therefore, within the effective usage region, the curve is a peaked portion 21 (the portion that is convex at the top), and the pressing load increases as the wear of the friction member increases (as the set line moves to the left in the drawing). That is, as the friction member wears down, the release load increases, and the driver has to exert a greater pressing force on the clutch pedal.

In view of this, one structure known in the past for cutting the peak in the pressing load curve was a peak-cut clutch, in which an elastic member is used to generate a load to counteract the load of the diaphragm spring when the friction member wears down. With a peak-cut clutch, the opposite-facing peaked portion of the curve of the elastic member is superimposed onto the peaked portion of the curve of the diaphragm spring, and as a result a flat portion is obtained in the composite load (see Japanese Laid-Open Utility Model Application H3-22131, for example).

SUMMARY OF THE INVENTION

With the conventional clutch cover assembly discussed above, a single cone spring is used as an elastic member for generating a load to cancel out the load of the diaphragm spring when the friction member wears down.

However, the flywheel and the clutch disk assembly are not present during the manufacture and shipping of a clutch cover assembly, so when the pressure plate and the diaphragm spring are installed, the pressure plate is biased by the diaphragm spring and moves a considerable distance in the axial direction. As a result, excessive deflection causes plastic deformation of the cone spring, and this changes the load characteristics of the cone spring. That is, the desired cone spring characteristics are not obtained during use.

It is an object of the present invention to prevent excessive deflection of a peak-cut elastic member during manufacture and shipping with a clutch cover assembly having a peak-cut structure.

A clutch cover assembly according to a first aspect of the present invention is a clutch cover assembly for pressing and releasing a friction member of a clutch disk assembly against and from the flywheel of an engine, including a clutch cover that is fixed to the flywheel, a pressure plate that is linked so as to be incapable of relative rotation with respect to the clutch cover, and that sandwiches the friction member between itself and the flywheel, a diaphragm spring that is supported by the clutch cover and biases the pressure plate to the flywheel side, an elastic member that is supported by the clutch cover and generates a load that resists the biasing force of the diaphragm spring, and a limiting mechanism that limits movement of the pressure plate to the flywheel side when the amount of wear of the friction member has reached a maximum allowable wear amount.

With this clutch cover assembly, when the amount of wear of the friction member has reached a maximum allowable wear amount, movement of the pressure plate is limited by the limiting mechanism. Therefore, during manufacture or shipping, for example, even if the pressure plate should be biased by the diaphragm spring in a state in which there is no flywheel or friction member, the biasing action of the diaphragm spring and the amount of movement of the pressure plate will be limited to a specific range, and as a result, deformation of the elastic member used for generating a load to resist the biasing force of the diaphragm spring will be limited to within a specific range. Thus, with this clutch cover assembly, this prevents plastic deformation of the elastic member caused by excessive deflection during manufacture and shipping.

Here, the "maximum allowable wear amount of the friction member" means the maximum amount of wear at which the friction member can still exhibit the desired torque transmission characteristics.

A clutch cover assembly according to a second aspect of the present invention is the clutch cover assembly of the first aspect, wherein the axial position of the pressure plate limited by the limiting mechanism corresponds to the pressing position of the pressure plate in a state in which the amount of wear of the friction member has reached a maximum allowable wear amount.

A clutch cover assembly according to a third aspect of the present invention is the clutch cover assembly of the second aspect, wherein the clutch cover has an annular clutch cover main body and a plurality of latching components extending from the clutch cover main body to the inside in the radial direction. The pressure plate is able to come into contact with the diaphragm spring and the latching components in the course of moving to the flywheel side.

A clutch cover assembly according to a fourth aspect of the present invention is the clutch cover assembly of the third aspect, wherein the diaphragm spring has an annular elastic component and a plurality of levers extending from the annular elastic component to the inside in the radial direction. The latching components are disposed opposite the levers in the axial direction.

As a result, the levers and the latching components can properly come into contact.

A clutch cover assembly according to a fifth aspect of the present invention is a clutch cover assembly for pressing and releasing a friction member of a clutch disk assembly against and from the flywheel of an engine, including a clutch cover that is fixed to the flywheel, a pressure plate that is linked so as to be incapable of relative rotation with respect to the clutch cover, and that sandwiches the friction member between itself and the flywheel, a diaphragm spring that is supported by the clutch cover and biases the pressure plate to the flywheel side, an elastic member that is supported by the clutch cover and generates a load that resists the biasing force of the diaphragm spring, and a limiting plate that is mounted on the clutch cover and limits deformation of the elastic member in the course of movement of the pressure plate to the flywheel side.

With this clutch cover assembly, deformation of the elastic member is limited by the limiting plate in the course of the movement of the pressure plate to the flywheel side. Therefore, during manufacture or shipping, for example, even if the pressure plate should be biased by the diaphragm spring in a state in which there is no flywheel or friction member, the amount of deformation of the elastic member can be limited to a specific range, and as a result, plastic deformation of the elastic member caused by excessive deflection during manufacture and shipping can be prevented.

A clutch cover assembly according to a sixth aspect of the present invention is the clutch cover assembly of the fifth aspect, wherein the axial position of the pressure plate in a state in which deformation of the elastic member is limited by the limiting plate corresponds to the pressing position of the pressure plate in a state in which the amount of wear of the friction member has reached a maximum allowable wear amount.

Here, the "maximum allowable wear amount of the friction member" means the maximum amount of wear at which the friction member can still exhibit the desired torque transmission characteristics.

A clutch cover assembly according to a seventh aspect of the present invention is the clutch cover assembly of the sixth aspect, wherein the elastic member is a cone spring. The limiting plate is an annular plate member whose outside diameter is smaller than the elastic member, and which is disposed opposite the elastic member in the axial direction.

In this case, the limiting mechanism can be realized with a simpler structure.

A clutch cover assembly according to an eighth aspect of the present invention is the clutch cover assembly of the seventh aspect, further including a support member that extends from the pressure plate to the transmission side, and that passes through the clutch cover. The elastic member is supported so as to be capable of elastic deformation between the clutch cover and the end of the support member. The limiting plate is disposed in the axial direction between the elastic member and the clutch cover.

A clutch cover assembly according to a ninth aspect of the present invention is the clutch cover assembly of the eighth aspect, wherein the support member passes through the limiting plate.

A clutch cover assembly according to a tenth aspect of the present invention is the clutch cover assembly of any one of the first to ninth aspects, wherein the elastic member is disposed on the opposite side of the clutch cover from the diaphragm spring.

A clutch cover assembly according to an eleventh aspect of the present invention is the clutch cover assembly of any one of the first to tenth aspects, wherein the elastic member generates a load that resists the biasing force of the diaphragm spring, and thereby smoothes out fluctuation in the pressing load on the pressure plate with respect to the amount of displacement of the diaphragm spring.

Figure 1:
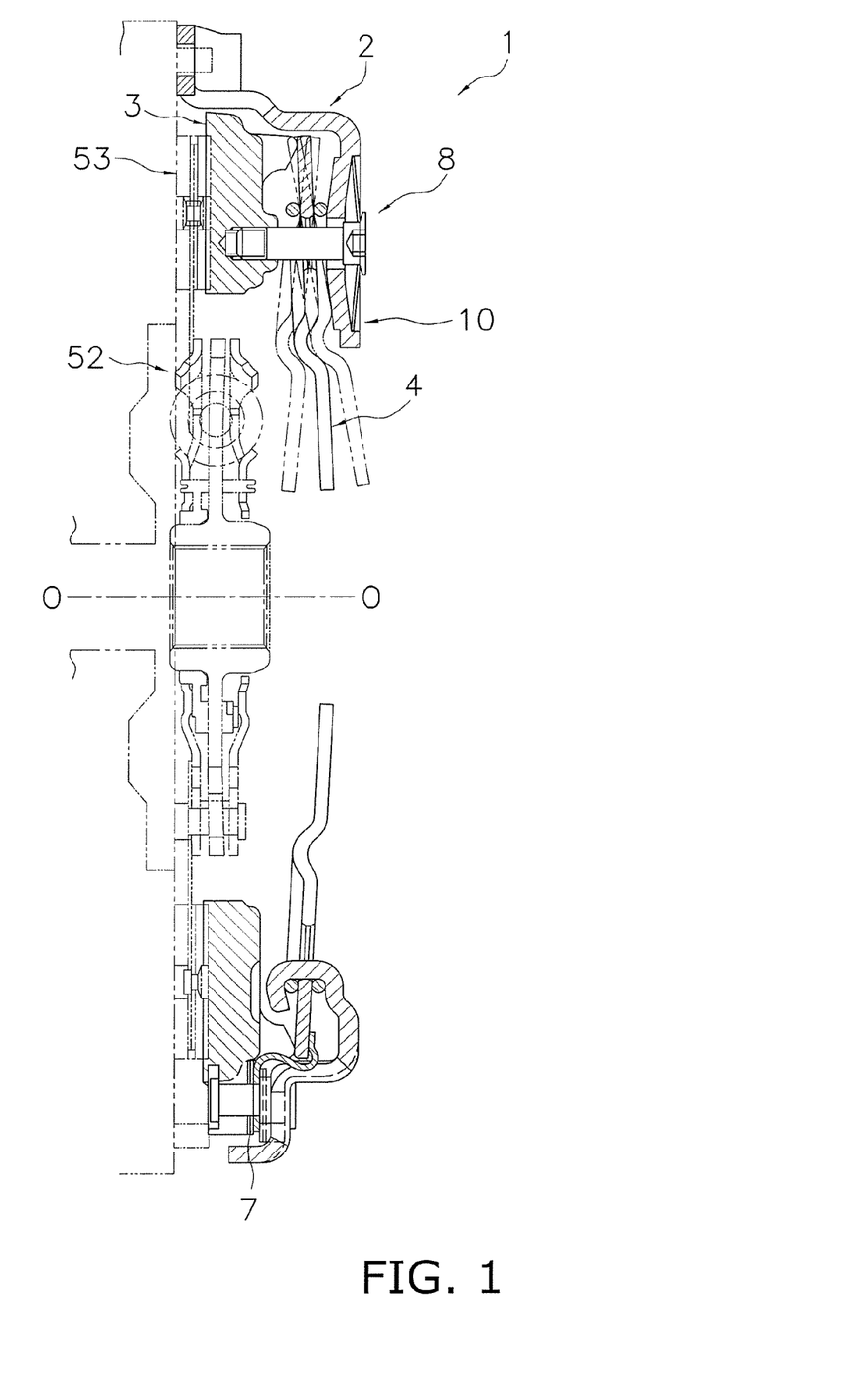
FIG. 1 is a simplified vertical cross section of the clutch cover assembly pertaining to a first embodiment of the present invention.
Figure 2:
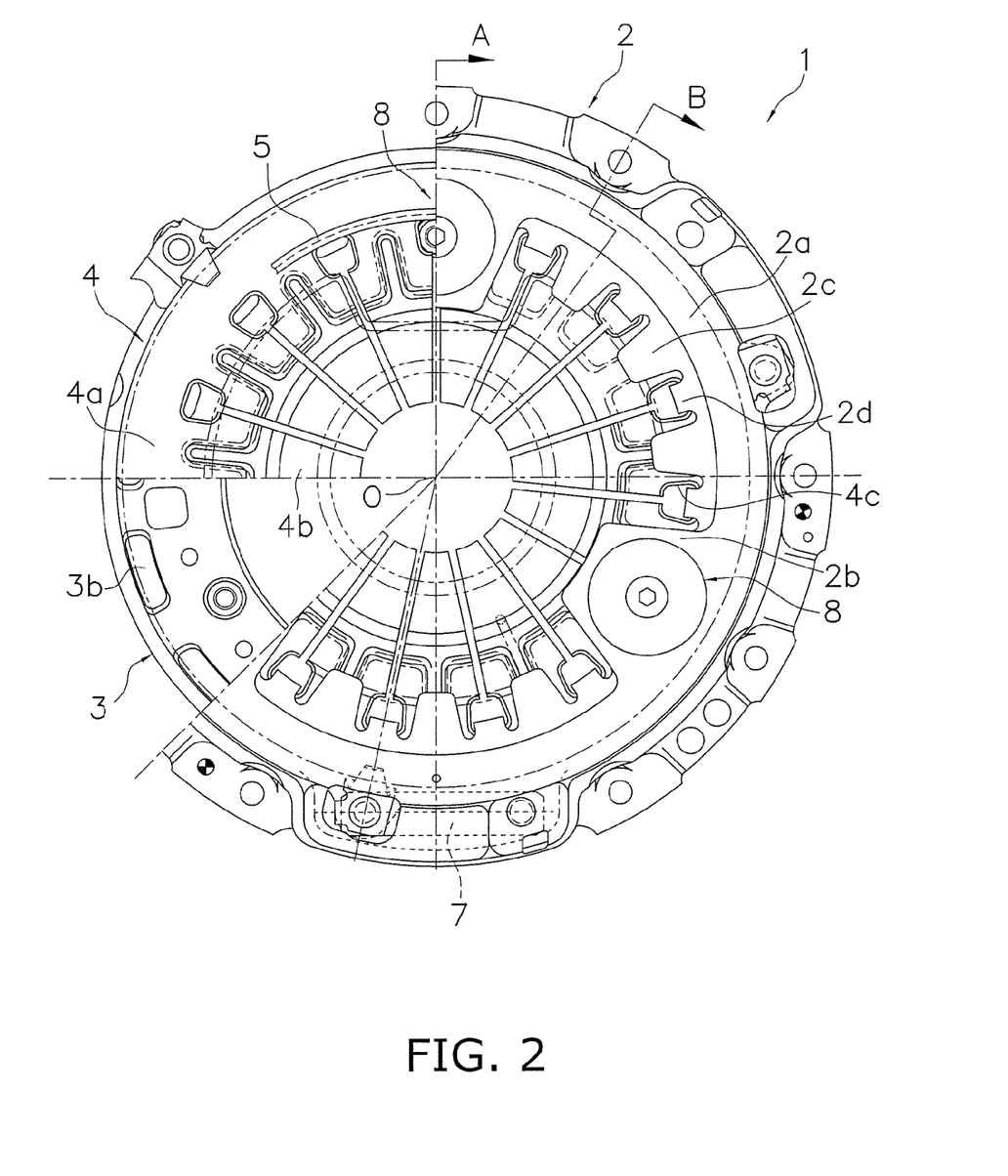
FIG. 2 is a simplified elevational view of the clutch cover assembly pertaining to the first embodiment of the present invention.
Figure 3:
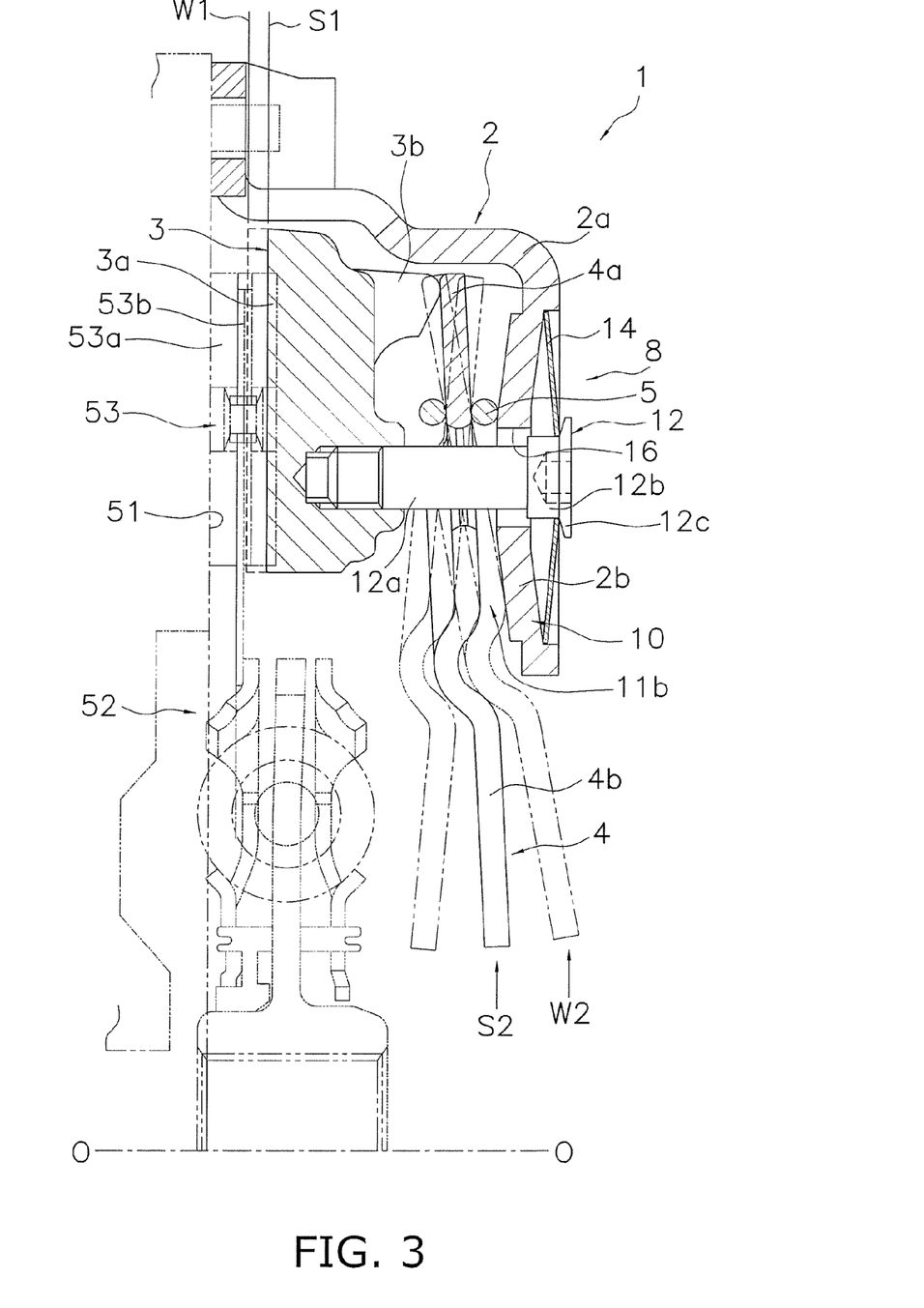
FIG. 3 is a simplified vertical cross section along the A line in FIG. 2.
Figure 4:
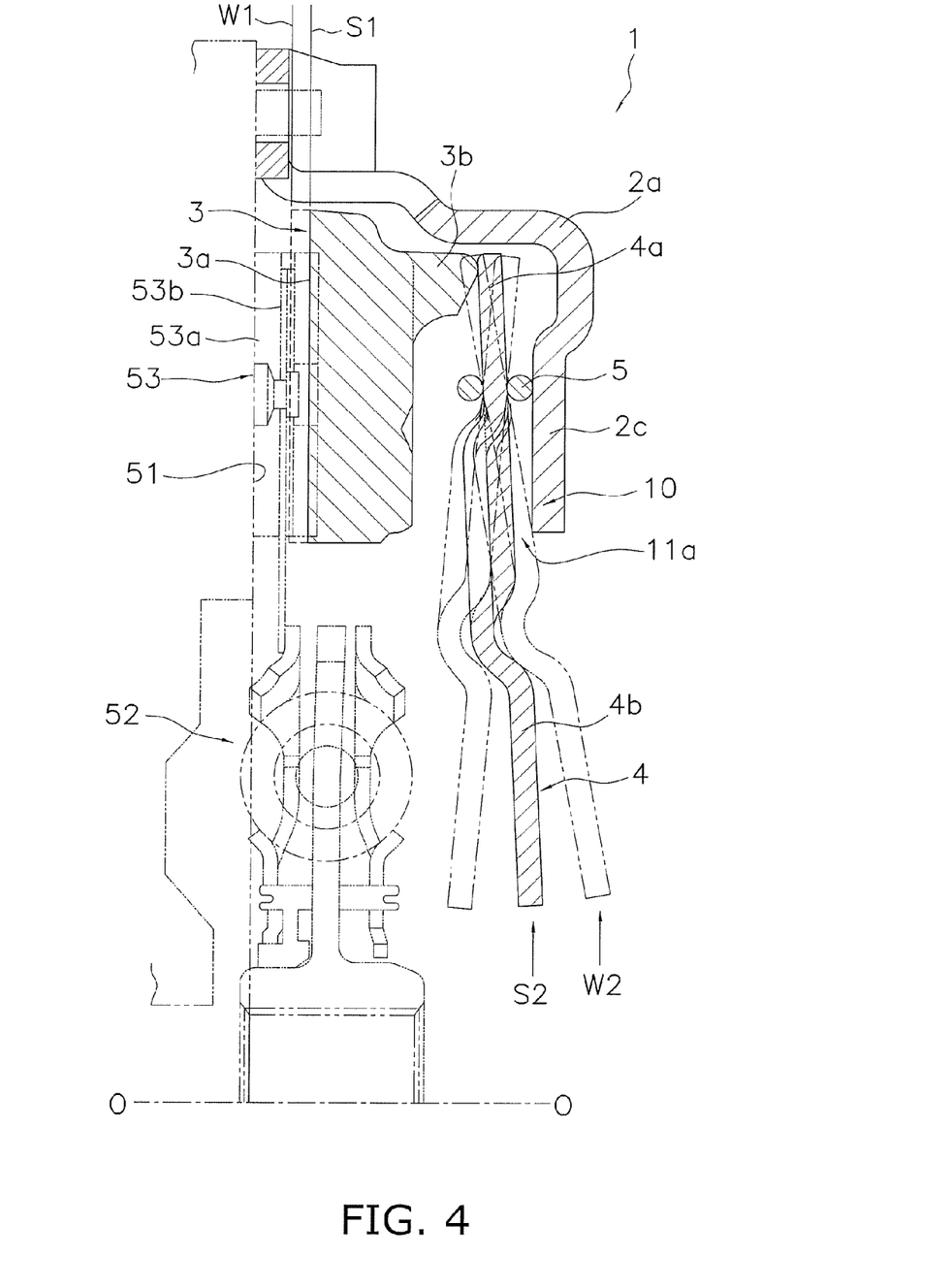
FIG. 4 is a simplified vertical cross section along the B line in FIG. 2.

DETAILED DESCRIPTION OF THE INVENTION (1) Overall Structure of Clutch Cover Assembly The overall structure of the clutch cover assembly 1 pertaining to the present invention will be described with reference to FIGS. 1 to 4. FIG. 1 is a simplified vertical cross section of the clutch cover assembly 1, FIG. 2 is a simplified plan view of the clutch cover assembly 1, FIG. 3 is a simplified vertical cross section along the A line in FIG. 2, and FIG. 4 is a simplified vertical cross section along the B line in FIG. 2. The O-O line shown in the drawings is the rotational axis of the clutch cover assembly 1 and a flywheel 51. The left side in the drawings will be referred to as the axial engine side below, and the right side in the drawings will be referred to as the axial transmission side.

The push-type diaphragm spring clutch cover assembly 1 shown in FIGS. 1 to 4 is a device for pressing a friction member 53 of a clutch disk assembly 52 against the flywheel 51 of the engine and thereby engaging the clutch, or for releasing this pressing to disengage the clutch. The friction member 53 has a friction facing 53*a* and a cushioning plate 53*b*, and has a cushioning function that allows deflection over a specific range in the axial direction.

The clutch cover assembly 1 mainly includes a clutch cover 2, a pressure plate 3, and a diaphragm spring 4.

The clutch cover 2 is a roughly dish-shaped plate member, and its outer periphery is fixed by bolts or the like to the flywheel 51. The clutch cover 2 has a disk-shaped portion that is opposite the outer peripheral part of the flywheel 51 with a gap in between in the axial direction. The clutch cover 2 has a clutch cover main body 2a that constitutes the main component, a plurality of support components 2d that support the diaphragm spring 4, a plurality of latching components 2c that extend inward in the radial direction from the clutch cover main body 2a, and three housings 2b that extend inward in the radial direction from the clutch cover main body 2a. The latching components 2c and the housings 2b constitute part of a limiting mechanism 10 (discussed below).

The pressure plate 3 is an annular member whose pressing face 3a is formed on the side opposite the flywheel 51. The friction member 53 of the clutch disk assembly 52 is disposed between the pressing face 3a and the flywheel 51. An annular protrusion 3b that protrudes in the axial direction on the opposite side from the pressing face 3a is formed on the pressure plate 3. The pressure plate 3 is linked by a plurality of strap plates 7 so as to be capable of movement in the axial direction, but incapable of relative rotation.

The diaphragm spring 4 is a disk-shaped member disposed between the pressure plate 3 and the clutch cover 2, and includes an annular elastic component 4a and a plurality of levers 4b that extend inward in the radial direction from the inner periphery of the annular elastic component 4a. The inner periphery of the annular elastic component 4a comes into contact with the protrusion 3b of the pressure plate 3. The inner periphery of the annular elastic component 4a is supported by the clutch cover 2 via a wire ring 5. In this state, the annular elastic component 4a biases the pressure plate 3 to the flywheel 51 side. There are slits between the levers 4b of the diaphragm spring 4, and oval holes 4c are formed at the outer periphery of these slits. A push-type release apparatus (not shown) is engaged at the distal ends of the levers 4b of the diaphragm spring 4. This release apparatus is constituted by a release spring, etc.

(2) Mechanism for Achieving Low Release Load Characteristics

Next, a mechanism 8 for achieving low release load characteristics will be described. The function of the low release load mechanism 8 is to smooth out the pressing load characteristics so that low release load characteristics can be achieved even when the friction member 53 has worn down. In this embodiment, three low release load mechanisms 8 are disposed around the circumferential direction. Therefore, the mechanisms 8 generate a load that is balanced in the circumferential direction.

The low release load mechanisms 8 are disposed at locations corresponding to the housings 2b of the clutch cover 2, and as shown in FIG. 3, each is made of a support bolt 12 (serving as the support member) and a cone spring 14 (serving as the elastic member). The support bolt 12 extends to the axial transmission side from the inner periphery of the face of the pressure plate 3 on the protrusion 3b side. Each support bolt 12 has a body 12a, a head 12b that has a larger outside diameter than the body 12a, and a flange 12c that has a larger outside diameter than the head 12b. The body 12a of the support bolt 12 extends in the axial direction through an oval hole 4c in the diaphragm spring 4. The housings 2b of the clutch cover 2 have a shape that is recessed in the form of a bowl toward the axial engine side, and holes 16 are formed at locations of the housings 2b corresponding to the support bolts 12. The body 12a of each support bolt 12 extends in the axial direction through a hole 16, and as a result, the heads 12b of the support bolts 12 are located more to the axial transmission side than the housings 2b. The cone springs 14 are housed on the axial transmission side of the housings 2b that are recessed in the axial direction. The outer peripheral edges of the cone springs 14 are supported by the outer peripheral edges of the housings 2b. The inner peripheral edges of the cone springs 14 are supported by the flanges 12c of the support bolts 12.

When the clutch has yet to wear down, the cone springs 14 do not generate a load when the clutch is engaged. However, when the friction member 53 of the clutch disk assembly 52 wears down, the pressure plate 3 and the support bolts 12 move toward the axial engine side, so the cone springs 14 are compressed between the clutch cover 2 and spring seats 13, and a load is exerted in the axial direction on both members. The load exerted by the cone springs 14 on the support bolts 12 and so forth acts on the opposite side from that of the pressing load exerted by the diaphragm spring 4 on the pressure plate 3, and the pressing load is reduced and, as a result, the release load is also kept low.

The pressing load curve in FIG. 5 will now be described. The curve 20 of the diaphragm spring 4 has the peaked portion 21 as already mentioned. In contrast, the curve 22 of the cone springs 14 of the low release load mechanisms 8 has a peaked portion on the opposite side (a portion that is convex at the bottom) that cancels out this portion 21, forming a composite load flat portion 24. Thus, the cone springs 14 realize the composite load flat portion 24, which ensures the sufficiently large wear allowance. As a result, there is almost no change in the force the driver exerts on the clutch pedal when the friction member 53 is worn compared to when it is not worn, and this provides better clutch feel during the release operation.

(3) Limiting Mechanism

This clutch cover assembly 1 includes a limiting mechanism 10 that limits the movement of the pressure plate 3 to the flywheel 51 side via the diaphragm spring 4. More specifically, as shown in FIGS. 2 to 4, the limiting mechanism 10 includes the latching components 2c and housings 2b of the clutch cover 2, and the levers 4b of the diaphragm spring 4.

As shown in FIG. 2, the latching components 2c are plate-shaped portions extending inward in the radial direction from the clutch cover main body 2a, and are formed at locations corresponding to the levers 4b of the diaphragm spring 4. The center of the latching components 2c in the peripheral direction substantially coincides with the center of the levers 4b in the peripheral direction. As shown in FIGS. 3 and 4, the latching components 2c are opposite the levers 4b in the axial direction, and distal ends of the latching components 2c can come into contact with the levers 4b.

As shown in FIG. 2, the housings 2b are plate-shaped portions extending inward in the radial direction from the clutch cover main body 2a, and are each formed at a location corresponding to two of the levers 4b. The center of each housing 2b in the peripheral direction substantially coincides with the center of the slit between the two levers 4b. As shown in FIGS. 3 and 4, the housings 2b are each opposite two of the levers 4b in the axial direction, and the portions of the housings 2b on the inside in the radial direction can come into contact with the levers 4b.

The relationship between the amount of wear of the friction member 53 and the positions of the pressure plate 3 and the diaphragm spring 4 will now be described. As shown in FIGS. 3 and 4, at the initial stage at which the friction member 53 has yet to be worn down, the positions of the pressure plate 3 and the diaphragm spring 4 when the clutch is engaged are the set positions S1 and S2. In this state, gaps 11a and 11b are formed between the latching components 2c and the housings 2b and the levers 4b in the axial direction.

However, once the amount of wear of the friction member 53 reaches the maximum allowable wear amount, the position of the pressure plate 3 becomes the worn position W1, the position of the diaphragm spring 4 becomes the latched position W2, and the levers 4b of the diaphragm spring 4 come into contact with and latch the latching components 2c and the housings 2b in the axial direction. At this point, the plurality of levers 4b come into contact with the latching components 2c and the housings 2b at substantially the same time. The "maximum allowable wear amount of the friction member" means the maximum amount of wear at which the friction member 53 can still exhibit the desired torque transmission characteristics, and corresponds to the wear allowance from the set line 25 to the wear line 26 shown in FIG. 5.

With the above configuration, in a state in which the main parts of the clutch cover assembly 1 have been assembled, the biasing operation of the diaphragm spring 4 is limited by the limiting mechanism 10 at the latching position W2. As this happens, movement of the pressure plate 3 to the flywheel 51 side is also limited to the wear position W1. Therefore, during manufacture or shipping, for example, even if the pressure plate should be biased by the diaphragm spring in a state in which there is no flywheel 51 or friction member 53, deformation of the cone springs 14 of the low release load mechanisms 8 will be limited to within a specific range. Thus, with this clutch cover assembly 1, this prevents plastic deformation of the cone springs 14 caused by excessive deflection during manufacture and shipping, and allows the desired low release load characteristics to be obtained.

Furthermore, since the latching position W2 of the diaphragm spring 4 corresponds to the wear position W1 of the friction member 53 as discussed above, the usage state of the clutch cover assembly 1 is not impeded by the limiting mechanism 10.

Also, the latching components 2c and the housings 2b come into contact with the levers 4b, but the configuration may be such that only the latching components 2c or the housings 2b come into contact.

(4) Clutch Engagement and Release

With this clutch cover assembly 1, in a state in which the release apparatus (not shown) is not exerting a load on the distal ends of the levers 4b of the diaphragm spring 4, the annular elastic component 4a exerts a pressing load on the pressure plate 3. As a result, the friction member 53 of the clutch disk assembly 52 is pressed against the flywheel 51, and torque is transmitted to the clutch disk assembly 52 (clutch engaged).

When the release apparatus (not shown) pushes the distal ends of the levers 4b of the diaphragm spring 4 to the engine side, the outer periphery of the annular elastic component 4a of the diaphragm spring 4 is pulled up to the axial transmission side, with the wire ring 5 acting as the fulcrum. As a result, the annular elastic component 4a no longer presses on the pressure plate 3, and the pressure plate 3 is pulled away from the friction member 53 by the strap plates 7, and finally the friction member 53 separates from the flywheel 51 (clutch disengaged).

(5) Another Embodiment of Limiting Mechanism

Figure 7:
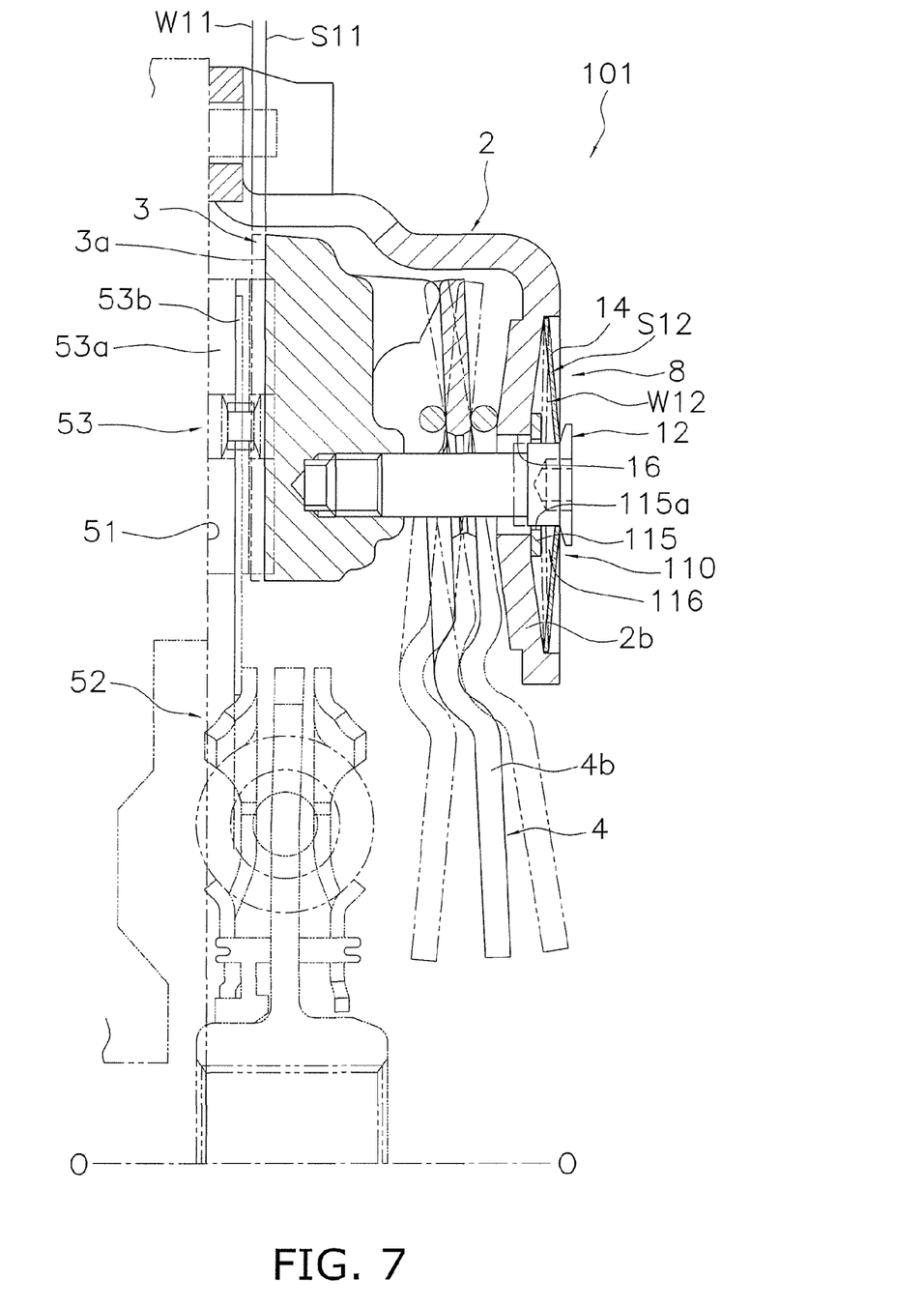
FIG. 7 is a simplified vertical cross section of the limiting mechanism of the clutch cover assembly pertaining to another embodiment of the present invention.

Another embodiment of the limiting mechanism 10 will be described through reference to FIG. 7. FIG. 7 is a simplified vertical cross section of the limiting mechanism of the clutch cover assembly 10 in another embodiment of the present invention. Those components that are the same as in the above embodiment are numbered the same.

A limiting mechanism 110 directly limits deformation of the cone springs 14 in the course of the diaphragm spring 4 biasing the pressure plate 3, and is installed in part of the low release load mechanisms 8 as shown in FIG. 7. More specifically, the limiting mechanism 110 includes the low release load mechanisms 8 and limiting plates 115. The configuration of the low release load mechanisms 8 is the same as described above, and will not be described again in detail.

The limiting plates 115 are annular plate members mounted on the clutch cover 2, and are disposed between the cone springs 14 and the housings 2b of the clutch cover 2. The limiting plates 115 are fixed by welding, etc., to the peripheral part of the holes 16 of the housings 2b, and the support bolts 12 of the low release load mechanisms 8 pass through holes 115a in the limiting plates 115. The limiting plates 115 have a smaller outside diameter than the cone springs 14, and are disposed opposite the inner periphery of the cone springs 14 in the axial direction.

The relationship between the amount of wear of the friction member 53 and the positions of the pressure plate 3 and the diaphragm spring 4 will now be described. As shown in FIG. 7, in the initial state in which the friction member 53 has yet to be worn down, the positions of the pressure plate 3 and the diaphragm spring 4 when the clutch is engaged are the set positions S11 and S12. In this state, a gap 116 is formed between the cone spring 14 and the limiting plate 115 in the axial direction.

However, once the amount of wear of the friction member 53 reaches the maximum allowable wear amount, the position of the pressure plate 3 becomes the worn position W11, the position of the cone spring 14 becomes the latched position W12, and the inner peripheries of the cone springs 14 come into contact with and latch the limiting plates 115.

As discussed above, deformation of the cone springs 14 is limited at the latched position W12 by the limiting mechanism 110. As a result, with this clutch cover assembly 1, this prevents plastic deformation of the cone springs 14 caused by excessive deflection during manufacture and shipping, and allows the desired low release load characteristics to be obtained.

Also, unlike with the limiting mechanism 10 discussed above, the gaps 116 can be set according to the outside diameter and thickness of the limiting plates 115. This simplifies the structure of the limiting mechanism 110 with this clutch cover assembly 101.

(6) Other Embodiments

The above embodiments are merely examples of the present invention, and various modifications are possible without departing from the gist of the present invention. For instance, a push-type clutch cover assembly was discussed in the above embodiments, but the present invention can also be applied to a pull-type clutch cover assembly.

INDUSTRIAL APPLICABILITY

With the present invention, excessive deflection of peak-cut elastic members during manufacture and shipping can be prevented in a clutch cover assembly having a peak-cut structure. Therefore, the present invention is useful in fields related to clutch cover assemblies having a peak-cut structure.

What is claimed is:

1. A clutch cover assembly being configured to press and to release a friction member of a clutch disk assembly against and from a flywheel of an engine, comprising:
   a clutch cover being fixed to the flywheel;
   a pressure plate being relatively unrotatably linked to the clutch cover, and the pressure plate sandwiching the friction member between the pressure plate and the flywheel;
   a diaphragm spring being supported by the clutch cover and biasing the pressure plate to a flywheel side;
   an elastic mechanism including a support member being fixed to the pressure plate, and an elastic member being supported by the clutch cover and support member and being compressed between the clutch cover and support member to generate a load that resists the biasing force of the diaphragm spring; and
   a limiting mechanism being configured to limit deformation of the elastic member within a specific range in the course of movement of the pressure plate to the flywheel side in order to prevent the elastic member from being fully compressed, the limiting mechanism being achieved by contacting of the elastic mechanism with the clutch cover.

2. The clutch cover assembly according to claim 1, wherein an axial position of the pressure plate in a state in which deformation of the elastic member is limited by the limiting mechanism corresponds to a pressing position of the pressure plate in a state in which the amount of wear of the friction member has reached a maximum allowable wear amount.

3. The clutch cover assembly according to claim 2, wherein the clutch cover includes a fixing portion fixed to the flywheel, and an accommodating portion disposed radially inward of the fixing portion and dimpled toward the pressure plate to accommodate the elastic member, and the limiting mechanism is achieved by contacting of the elastic mechanism with the accommodating portion.

4. The clutch cover assembly according to claim 3, wherein the elastic member is a cone spring, the accommodating portion includes a supporting portion supporting an outer peripheral portion of the elastic member, and a limiting portion configured to be in contact with an inner peripheral portion of the elastic member, and
the limiting mechanism is achieved by contacting of the inner peripheral portion of the elastic member with the limiting portion in the course of moving to the flywheel side.

5. The clutch cover assembly according to claim 4, wherein the limiting portion is an annular plate member whose outside diameter is smaller than the elastic member, and is disposed opposite the elastic member in the axial direction.

6. The clutch cover assembly according to claim 5, wherein the support member passes through the limiting portion.

7. The clutch cover assembly according to claim 6, wherein the elastic member is disposed on the opposite side of the clutch cover from the diaphragm spring.

8. The clutch cover assembly according to claim 1, wherein the elastic member generates a load that resists the biasing force of the diaphragm spring, and smoothes out a fluctuation in the pressing load on the pressure plate with respect to the amount of displacement of the diaphragm spring.

9. The clutch cover assembly according to claim 1, wherein the elastic member is disposed on the opposite side of the clutch cover from the diaphragm spring.

10. The clutch cover assembly according to claim 9, wherein
the elastic member generates a load that resists the biasing force of the diaphragm spring, and smoothes out a fluctuation in the pressing load on the pressure plate with respect to the amount of displacement of the diaphragm spring.

* * * * *